United States Patent
Rumreich et al.

(10) Patent No.: US 7,253,845 B2
(45) Date of Patent: Aug. 7, 2007

(54) COLOR NON-UNIFORMITY CORRECTION FOR LCOS

(75) Inventors: Mark Francis Rumreich, Indianapolis, IN (US); Daniel Mark Hutchinson, Carmel, IN (US); John Alan Hague, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 269 days.

(21) Appl. No.: 10/142,573

(22) Filed: May 9, 2002

(65) Prior Publication Data

US 2003/0137606 A1 Jul. 24, 2003

Related U.S. Application Data

(60) Provisional application No. 60/350,619, filed on Jan. 22, 2002.

(51) Int. Cl.
H04N 9/64 (2006.01)
H04N 9/69 (2006.01)

(52) U.S. Cl. .................... 348/649; 348/675

(58) Field of Classification Search ........ 348/624, 348/574, 645, 646, 647, 649, 650, 651, 674, 348/675, 687, 441, 448, 459; 358/518, 519, 358/523; 345/589, 593, 596, 597; 382/167
See application file for complete search history.

(56) References Cited

U.S. PATENT DOCUMENTS

| | | | | |
|---|---|---|---|---|
| 4,833,532 A | * | 5/1989 | Abe | 348/675 |
| 5,255,083 A | * | 10/1993 | Capitant et al. | 358/448 |
| 5,260,787 A | * | 11/1993 | Capitant et al. | 348/459 |
| 6,026,179 A | * | 2/2000 | Brett | 348/649 |
| 6,226,034 B1 | * | 5/2001 | Katayama | 348/242 |
| 6,456,340 B1 | * | 9/2002 | Margulis | 348/745 |
| 2001/0015835 A1 | * | 8/2001 | Aoki | 358/525 |

* cited by examiner

Primary Examiner—Sherrie Hsia
(74) Attorney, Agent, or Firm—Joseph J. Laks; Harvey D. Fried

(57) ABSTRACT

A method (400) and a system (100) for providing video signals to video displays includes the steps of receiving at least one input video signal (150), dithering the non-uniformity color correction (445), applying the non-uniformity color correction to the input video signal to generate a color corrected video signal (450), and increasing a frame rate of the color corrected video signal (120). Gamma correction (125) can be applied to the color correction. Generating a dithered non-uniformity color correction can include selecting from a data storage (115) a plurality of RGB correction matrices (300), measuring at least one brightness level of the input video signal, selecting for the picture level correction a first RGB correction matrix if the brightness is within a first range of values (425), a second RGB correction matrix if the brightness is within a second range of values (435), and interpolating (440) the plurality of RGB correction matrices if the brightness is within a third range of values.

23 Claims, 5 Drawing Sheets

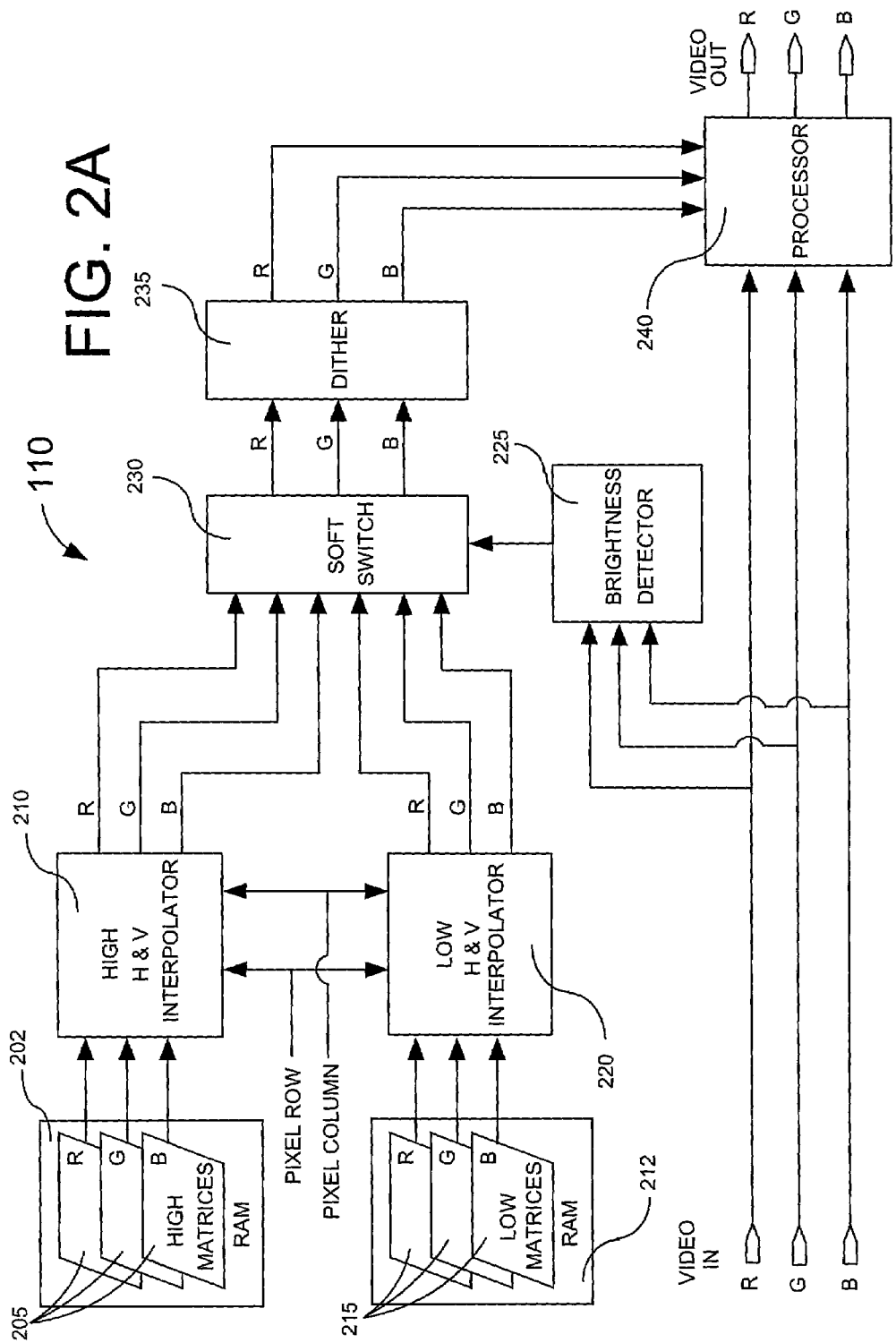

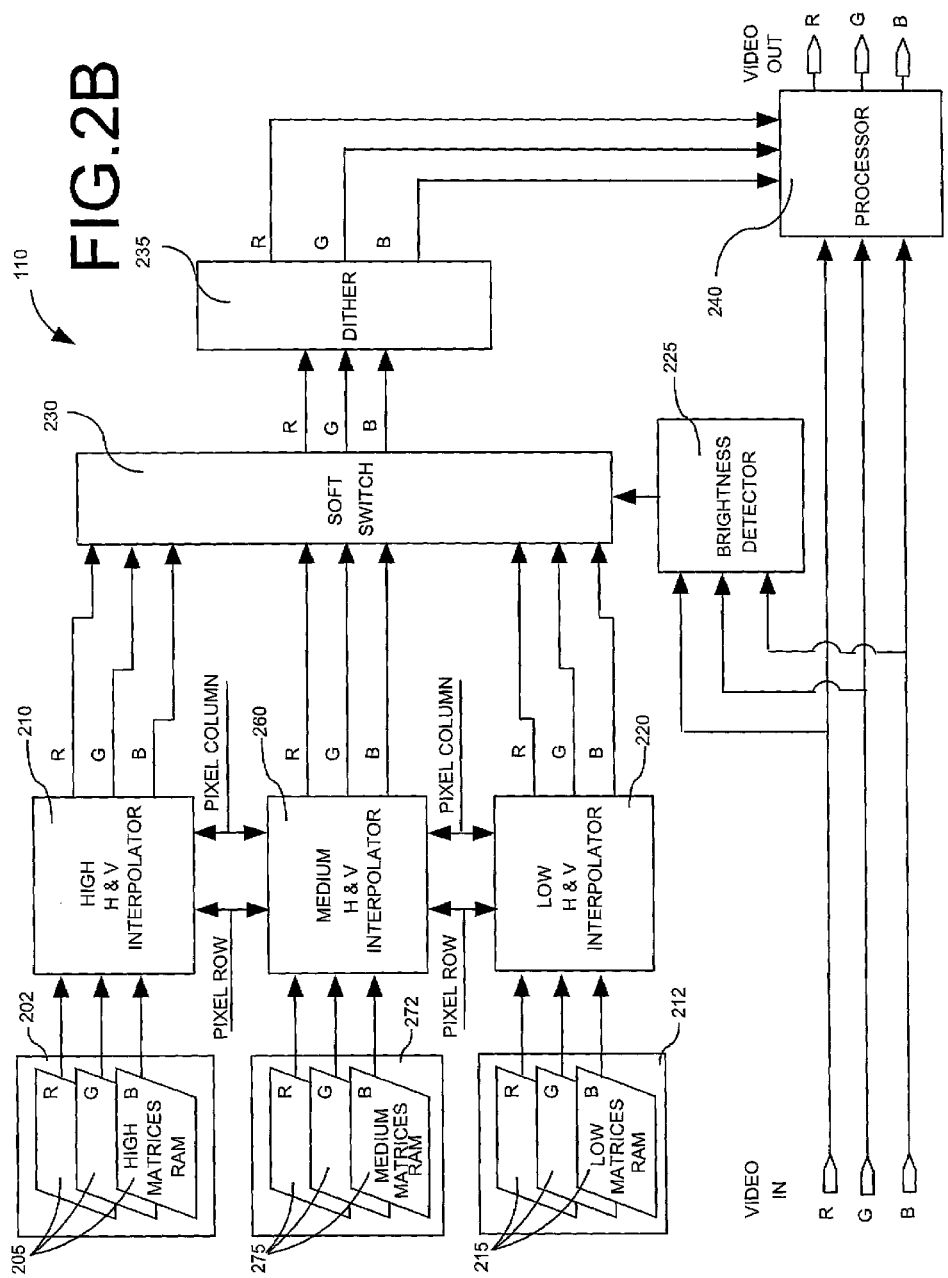

COLOR NON-UNIFORMITY CORRECTION FOR LCOS

CROSS REFERENCE TO RELATED APPLICATIONS

This application is a continuation of provisional patent application Ser. No. 60/350,619 filed Jan. 22, 2002 and claims the benefit of the filing date thereof.

BACKGROUND OF THE INVENTION

1. Technical Field

The present invention relates to the field of video display optics, and more particularly to color correction techniques used with display optics.

2. Description of the Related Art

LCOS display systems incorporate a high pressure lamp and a light engine for generating a video display in lieu of a cathode ray tube found in traditional video displays. The light engine receives ultra bright light from the high pressure lamp and processes the light through display optics contained within the light engine. Display optics are typically provided for each of the base colors, namely red, green and blue. Variations between the display optics tend to cause color non-uniformity in the LCOS displays. For example, the green optics of a particular LCOS light-engine may be slightly more transmissive in the top left corner. This would produce a green zone in the top left corner of the displayed image. Other LCOS light-engines can have non-uniform zones in other areas of the display. The degree and nature of color non-uniformity varies tremendously from light-engine to light-engine. Notwithstanding, color non-uniformity also changes as a function of pixel brightness. Hence the color non-uniformity can vary as the brightness level of video changes.

Color non-uniformity correction has been implemented to address color non-uniformity in LCOS displays, however current implementation requires substantial processing resources to implement color non-uniformity correction. Color non-uniformity correction is typically performed after frame rate doubling and gamma correction have been applied to a video signal. To perform color non-uniformity correction after frame rate doubling results in the color non-uniformity correction being applied to twice as much data as contained in an original video signal. Further, gamma correction increases the size of the video data. Hence, performing color non-uniformity correction after gamma correction further increases the amount of video data that must be processed.

On the other hand, applying color non-uniformity correction prior to frame rate doubling and gamma correction creates an even greater obstacle. Color non-uniformity correction typically increases the amount of video data contained in a video signal as well. However, the frame rate doubler is limited with respect the amount of video data that can be processed. Thus a "bit bottleneck" is created and video data incorporating color non-uniformity correction cannot be adequately processed by the frame rate doubler. Even if the color non-uniformity corrected video could be adequately doubled, the amount of video data handled by the rest of the processing components would be increased. Thus, a need exists for a method and system for color non-uniformity correction prior to increasing the frame rate that overcomes the problems described above.

SUMMARY OF THE INVENTION

The present invention relates to a method and a system for providing video signals to video displays, including the steps of receiving at least one input video signal, generating a non-uniformity color correction which can include generating a dithered non-uniformity color correction, applying the non-uniformity color correction to the input video signal to generate a color corrected video signal, and increasing a frame rate of the color corrected video signal. The method can further include the steps of following the frame rate increase step, applying a gamma correction to the color corrected video signal to generate an output video signal, and providing the output video signal to a light engine of a liquid crystal on silicon video display.

The step of generating the dithered non-uniformity color correction can include selecting from data storage a plurality of RGB correction matrices, deriving a picture level correction from the plurality of RGB correction matrices, and dithering the picture level correction. Horizontal and vertical pixel interpolation can be performed on the RGB correction matrices after selecting plurality of RGB correction matrices. The step of deriving the picture level correction can include measuring at least one brightness level of the input video signal, selecting for the picture level correction a first RGB correction matrix if the brightness level is within a first range of values, selecting for the picture level correction a second RGB correction matrix if the brightness level is within a second range of values, and interpolating the picture level from the plurality of RGB correction matrices if the brightness level is within a third range of values. The dithered non-uniformity color correction can be added to the input video signal or can multiply the input video signal.

The system for providing video signals to video displays can include a video input for receiving at least one input video signal, a color non-uniformity corrector for generating a color corrected video signal, a frame rate increaser for increasing the frame rate of the color corrected video signal, and a gamma corrector for applying gamma correction to the color corrected video signal. The color non-uniformity corrector can include a correction generator for generating a non-uniformity color correction signal, a ditherer for dithering the non-uniformity color correction signal, and a processor for incorporating the non-uniformity color correction into the at least one input video signal to generate a color corrected video signal. The processor can be an adder or a multiplier.

The system can further include at least one data storage for storing a plurality of RGB correction matrices. The data storage can include at least one EEPROM. At least one horizontal and vertical interpolator for performing pixel interpolation on the RGB correction matrices also can be provided. The correction generator can include a brightness detector for detecting the brightness of the input video signal and outputting a brightness level measurement and a soft switch for receiving the brightness level measurement and generating a color correction based on the brightness level measurement. The soft switch can receive at least one RGB correction matrix from at least one of the data storage and the horizontal and vertical interpolator and generate the color correction from the RGB correction matrices. The soft switch can select a first RGB correction matrix if the brightness measurement level is within a first range of values, select a second RGB correction matrix if the brightness measurement level is within a second range of values, and interpolate a plurality of RGB correction matrices if the brightness measurement level is within a third range of values.

BRIEF DESCRIPTION OF THE DRAWINGS

FIG. 2A is a block diagram of color non-uniformity correction corrector in accordance with the present invention.

FIG. 2B is a block diagram of an alternate embodiment for a color non-uniformity correction corrector in accordance with the present invention.

DETAILED DESCRIPTION OF THE PREFERRED EMBODIMENTS

Figure 1:
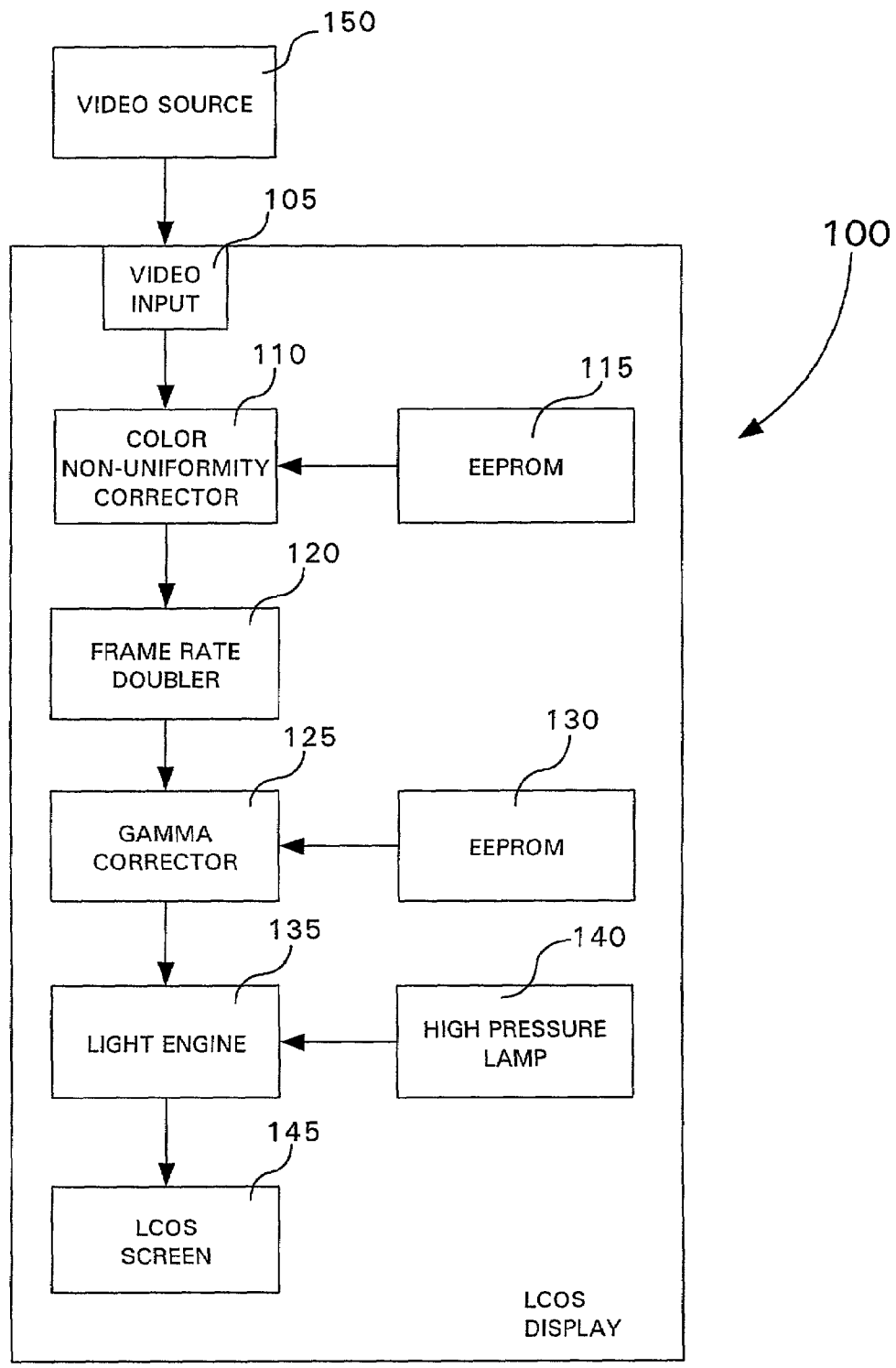
FIG. 1 is a block diagram of a liquid crystal on silicon display incorporating color non-uniformity correction in accordance with the present invention.

FIG. 1 shows a block diagram of a liquid crystal on silicon (LCOS) display 100 incorporating color non-uniformity correction. The LCOS display 100 can receive video data from a video source 150. The video source 150 can be a multimedia device, for example a television tuner, a digital video disk (DVD) player, a video cassette recorder (VCR), a personal video recorder (PVR), a digital broadcast receiver, etc. Typically, the video source 150 can incorporate a video processor for processing multimedia data and outputting video data in a format compatible with the LCOS display 100.

The LCOS display 100 can comprise video input 105, color non-uniformity corrector 110 and an associated electrically erasable programmable read-only memory (EEPROM) 115, a frame rate doubler 120, a gamma corrector 125 and associated EEPROM 130, a light engine 135, a high pressure lamp 140 and an LCOS screen 145. The video input 105 can receive an input video signal from a video source 150 and forward the input video signal to the color non-uniformity corrector 110.

The color non-uniformity corrector 110 can incorporate color non-uniformity correction into the input video signal to generate a color corrected video signal. EEPROM 115 can store a plurality of red, green, and blue (RGB) correction matrices for correcting the RGB brightness levels of the LCOS screen 145. The RGB correction matrices can be used for generating non-uniformity color correction and can be created from test measurements made on the LCOS display 100 during or after manufacture of the LCOS display 100.

Liquid crystals of a light engine 135 can be damaged by DC voltage and may only be driven by AC voltage. Since liquid crystals are responsive to the absolute value of a voltage, pixels can be driven by a first polarity of signal, then an opposite polarity of signal. Accordingly, frame rate doubler 120 can generate two frames of video in opposite polarities from each frame of color corrected video received. Hence, each frame of the color corrected video signal may be displayed twice, once for each polarity. Nevertheless, it should be noted that the LCOS display 100 is not limited to only doubling the frame rate. For example, in another arrangement the frame rate of the color corrected video signal can be increased by any multiple, for example 3×, 4×, 5×, 6×, etc.

Gamma corrector 125 can apply gamma correction to a color corrected video signal after the frame rate of the signal has been doubled to generate an output video signal. Gamma correction is a nonlinear transfer characteristic that corrects for the nonlinear relationship between a liquid crystal imager reflectivity and an applied voltage. Since gamma correction increases the number of bits in a video signal and a frame rate doubler 120 is typically limited with respect to the amount of video data that can be processed, having the gamma corrector 125 after the frame rate doubler 120 is advantageous. EEPROM 130 can store a plurality of gamma correction data associated with the light engine 135.

Light engine 135 can receive light from high pressure lamp 140. The light can be directed into a prism in the light engine where it is divided into the three RGB primary color streams. These three individual streams of light are directed to corresponding light valves, which are highly reflective mirrors contained in the light engine known as imagers, where they can pick up the output video signal as they are reflected off the surface of the imager. The three streams of light, each with their specific piece of the same video signal attached, then can be recombined within the prism into a single synchronized video image that is forwarded to the LCOS screen 145 for display. It should be noted that although the present embodiment is an LCOS display, the present invention is not limited to such and can be used with other liquid crystal displays.

Referring to FIG. 2A, a block diagram of color non-uniformity corrector 110 is shown. High RGB correction matrices 205, one for each red, green and blue, can be stored in EEPROM 115. Upon system startup the high RGB correction matrices 205 can be transferred from EEPROM 115 to random access memory (RAM) 202. High horizontal and vertical interpolator (HHVI) 210 can read high RGB correction matrices 205 from RAM 202. The high RGB correction matrices 205 can contain correction values correlating to a limited number of individual pixels in the LCOS screen 145. For example, the correction values in the high RGB correction matrices 205 can be based on required brightness adjustment levels for a video signal having a brightness level of 30%.

The HHVI 210 can perform horizontal and vertical interpolation on the high RGB correction matrices 205 to generate interpolated high RGB correction matrices (high interpolated matrices). The horizontal and vertical interpolation process derives correction values correlating to pixels located between pixels represented in the high RGB correction matrices 205.

Low RGB correction matrices 215 can be transferred from EEPROM 115 to RAM 112 upon system startup. During system operation the low RGB correction matrices 215 can be supplied to low horizontal and vertical interpolator (LHVI) 220 from RAM 212. The low RGB correction matrices 215 can have the same structure as the high RGB correction matrices 205. But the low RGB correction matrices 215 can contain correction reference values for low RGB brightness levels on the LCOS screen 145, for example at a brightness reference level of 10%. As with HHVI 210, the LHVI 220 also can perform horizontal and vertical interpolation using the discrete point low RGB correction reference values. Accordingly, the LHVI 220 can generate low RGB interpolation matrices containing low brightness level correction values.

FIG. 2B illustrates an alternate embodiment for the color non-uniformity corrector 110. In addition to the elements shown in FIG. 2A, the color non-uniformity corrector 110 of FIG. 2B further comprises medium RGB correction matrices 275 and a medium horizontal and vertical interpolator (MHVI) 260. The medium RGB correction matrices 275 can be provided based on required brightness adjustment levels for a video signal having a brightness level of 20%. During system operation the medium RGB correction matrices 275 can be supplied to MHVI 260 from RAM 272 to generate medium RGB interpolation matrices. The medium RGB correction matrices 275 can have the same structure as the high RGB and low RGB correction matrices 205 and 215.

In one embodiment the interpolation process performed by HHVI 210, LHVI 220 and MHVI 260 is continuous and RGB correction values are interpolated for pixels as they are required by the soft switch 230. In an alternate embodiment the RGB correction matrices can be interpolated once and the resulting high, medium and low RGB interpolation matrices can be stored in a storage, such as an EEPROM, and transferred to RAM upon system startup. The soft switch 230 then can retrieve correction values from the RAM as required without the need for continuous horizontal and vertical interpolation.

As previously noted, the RGB correction matrices 205, 215 and 275 can be generated from test measurements made on the LCOS display 100 during or after manufacture of the LCOS display 100. Further, additional RGB correction matrices can be provided for various brightness levels.

Brightness detector 225 can measure the individual brightness of each of the red, blue and green components of each pixel in an incoming video signal and sum these measurements to generate a brightness level for each pixel. For example, if a particular pixel has a red brightness of 10, a green brightness of 20, and a blue brightness of 50, the brightness for the pixel is 80. The brightness level for each pixel then can be forwarded to soft switch 230. The soft switch 230 can evaluate the brightness level and generate a picture level correction based on the measured brightness data. The picture level correction can contain RGB correction values for each pixel. In one arrangement the soft switch 230 can select RGB correction values from the high RGB interpolation matrices, medium RGB interpolation matrices and the low RGB interpolation matrices.

The soft switch can interpolate values from the RGB interpolation matrices for brightness levels falling between the reference brightness values. For example, values for a high, medium and low brightness thresholds. If the brightness for the pixel is above the high pixel threshold, the soft switch 230 can select the correlating RGB correction values for that pixel from the high RGB interpolation matrices and use these values for the picture level correction. The next pixel may have a brightness below the low brightness threshold. In this case the soft switch 230 can select correlating RGB correction values for that pixel from the low RGB interpolation matrices and uses these correction values for the picture level correction.

In our example of FIG. 2B, a third pixel may have brightness between the high and medium threshold values. In this case the soft switch 230 can interpolate the correlating RGB correction values contained in the high and medium RGB interpolation matrices to derive new RGB correction values for the third pixel in the picture level correction. If a fourth pixel has a brightness value between the medium and low threshold values, the soft switch 230 can interpolate the correlating RGB correction values contained in the medium and low interpolation matrices to derive the fourth pixel's RGB correction values.

As previously noted, additional RGB interpolation matrices can be provided. Accordingly, the soft switch can interpolate values from these matrices as well. When only two RGB interpolation matrices are provided, as in the case of FIG. 2A, the soft switch can interpolate values from the high and low RGB interpolation matrices for brightness levels falling between the high and low reference values.

Ditherer 235 can receive the picture level correction from soft switch 230 and dither the picture level correction. Ditherer 235 can dither the picture level correction to reduce the bit resolution of the correction values contained therein. As would be known to one skilled in the art of video processing, dithering approximates a color from a mixture of other colors when the required color is not available. For example, if an 8-bit value is contained in a picture level correction, this 8-bit value can be approximated by two or more 6-bit values, which are provided in a specific sequence. The specific sequence is chosen so that the average of the displayed 6-bit values over a specific period is equal to or nearly equal to the original undithered 8-bit value. For example, if the 8-bit picture correction value is 55.75, the dithered result can be the following sequence displayed over a four-cycle period: 56, 56, 56 and 55.

A processor 240 can be encoded as an adder and can add the dithered picture level correction to the input video to generate a color corrected output video signal. In this embodiment the correction values contained in the picture level correction can be additive values. Alternatively, a multiplier can be used for the processor 240. In this second embodiment the correction values contained in the picture level correction can be multiplication factors.

Figure 3:
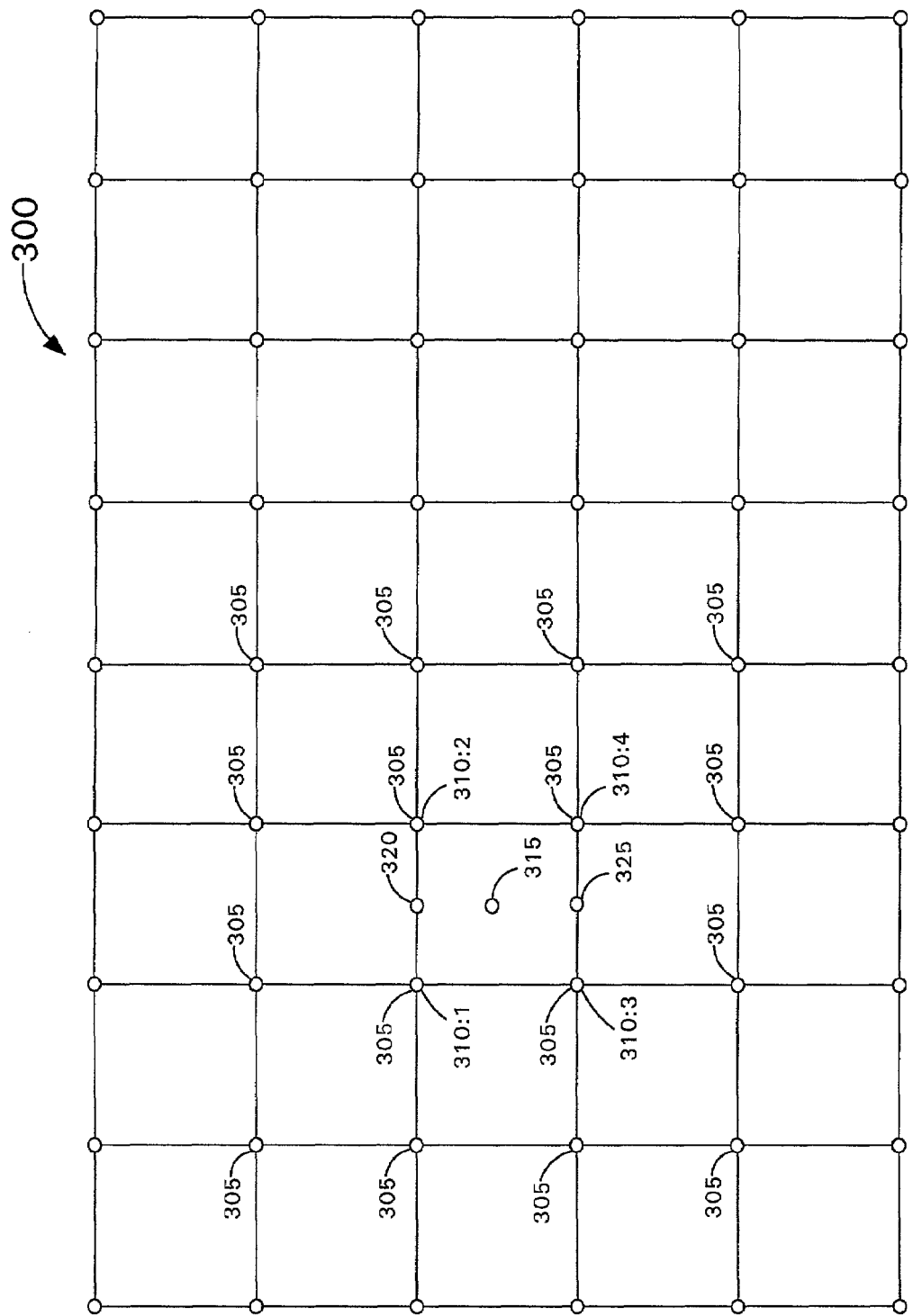
FIG. 3 is a diagram showing a matrix of discrete points arranged in a grid pattern and having associated correction values in accordance with the present invention.

Referring to FIG. 3, an example of an RGB correction matrix 300 is shown. Three RGB correction matrices can be provided for each reference brightness level, one matrix for each RGB color. Discrete points 305 can be equivalently spaced in a grid pattern fitting within the dimensions of the LCOS screen 145. For example, the discrete points 305 can be arranged in a grid pattern having 6 rows and 9 columns (6×9). For example, pixel 315 can be located between pixels 310:1, 310:2, 310:3 and 310:4. Pixels 310:1–4 can be located at discrete points 305 and the RGB correction values for pixels 310:1–4 can be the RGB correction values for their respective discrete points 305. The RGB correction value for pixel 315 can be interpolated from the correction values for pixels 310:1–4 using vertical and horizontal interpolation techniques, as would be known to one skilled in the art of video processing.

For example, the horizontal position of pixel 315 can be noted and horizontal interpolation can be performed on the correction values for pixels 310:1 and 310:2 to derive a first horizontal reference value 320 correlating to the horizontal position of pixel 315. Horizontal interpolation then can be performed on the correction values for pixels 310:3 and 310:4 to derive a second horizontal reference value 325 correlating to the horizontal position of pixel 315. Next, the vertical position of pixel 315 can be noted and vertical interpolation can be performed on the first and second horizontal reference values 320, 325 correlating to the vertical position of pixel 315, therein deriving a correction value for pixel 315. Two fractional bits typically are produced during horizontal and vertical interpolation process. For example, if the correction values for pixels 310:1–4 are 6-bit values, the interpolated correction value for pixel 315 can be an 8-bit value, which comprises 6 primary bits and 2 fractional bits. These fractional bits can be retained in the correction value derived for pixel 315 and can be incorporated into a corresponding RGB interpolation matrix, being removed later during the dithering process.

Figure 4:
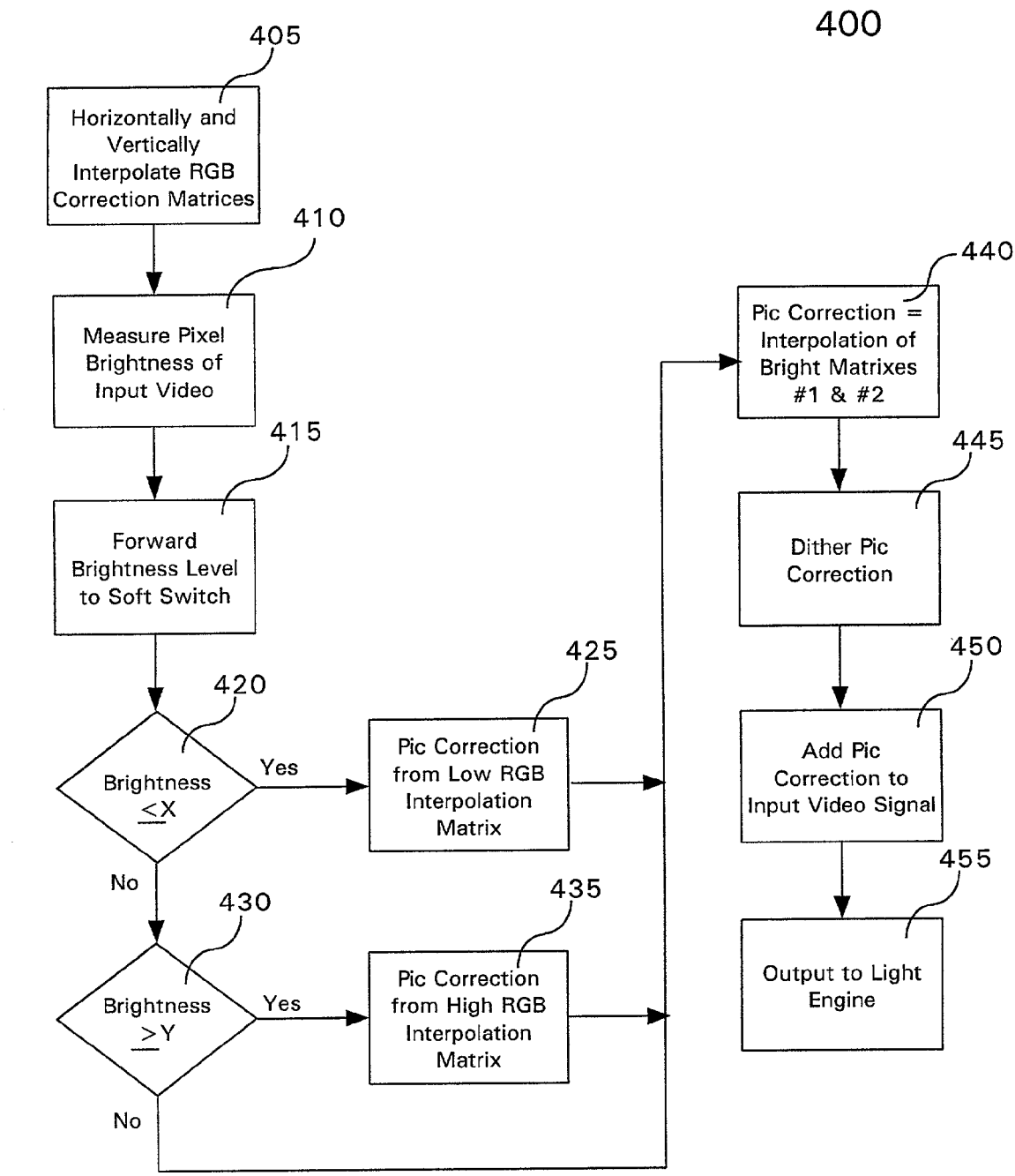
FIG. 4 is a flow chart showing the method of performing non-uniformity correction in accordance with the present invention.

FIG. 4 shows a flow chart 400 illustrating the method of performing non-uniformity correction using high and low RGB correction marices. As previously noted, additional RGB correction matrices can be used as well. At step 405, HHVI 210 and LHVI 220 can interpolate the high RGB correction matrices 205 and the low RGB correction matrices 215, respectively, to generate high and low RGB interpolation matrices. At step 410 the brightness detector 225 can measure the individual brightness of each of the red, blue and green components of each pixel in an incoming video signal and sum these measurements to generate a brightness level for each pixel. The brightness level for each pixel then can be forwarded to the soft switch 230, as shown in step 415.

Referring to decision block 420 and step 425, if the brightness level for a pixel is less than or equal to a first value, X, then RGB correction values for that pixel can be selected from the corresponding correction values in the low RGB interpolated matrices and entered into the picture level correction. Referring to decision block 430 and step 435, if the brightness level for a pixel is greater than or equal to a second value, Y, then RGB correction values for that pixel can be selected from the corresponding correction values in the high RGB interpolated matrices and entered into the picture level correction. If the brightness level for the pixel is greater than X and less than Y, then the RGB correction values for that pixel can be interpolated at step 440 from the corresponding correction values in the high and low RGB interpolated matrices and entered into the picture level correction.

At step 445 the ditherer 235 can dither the picture level correction to reduce the bit resolution of the correction values contained therein, as previously explained. At step 450 the adder 240 can add picture correction to the input video signal to generate a color corrected output video signal, which can be provided as an output to a light engine at step 455. As previously noted, a multiplier also can be used in lieu of adder 240.

It should be understood that the examples and embodiments described herein are for illustrative purposes only and that various modifications or changes in light thereof can be suggested by persons skilled in the art and are to be included within the spirit and purview of this application. The invention can take many other specific forms without departing from the spirit or essential attributes thereof for an indication of the scope of the invention.

We claim:

1. A method for color correcting video signals in video displays, comprising the steps of:
   receiving at least one input video signal;
   generating a dithered non-uniformity color correction;
   applying said dithered non-uniformity color correction to said input video signal to generate a color corrected video signal; and
   increasing a frame rate of said color corrected video signal.

2. The method of claim 1, further comprising the steps of:
   following the frame rate increase step, applying a gamma correction to said color corrected video signal to generate an output video signal; and
   providing said output video signal to a light engine of a liquid crystal on silicon video display.

3. The method of claim 1, wherein said step of generating the dithered non-uniformity color correction comprises:
   selecting from a data storage a plurality of RGB correction matrices;
   deriving a picture level correction from said plurality of RGB correction matrices; and
   dithering said picture level correction.

4. The method of claim 3, wherein said deriving the picture level correction step comprises:
   measuring at least one brightness level of said input video signal; and
   interpolating said picture level from said plurality of RGB correction matrices based at least upon said at least one brightness level.

5. The method of claim 3, wherein said deriving the picture level correction step comprises:
   measuring at least one brightness level of said input video signal; and
   selecting for said picture level correction at least one of said plurality of RGB correction matrices based at least upon said at least one brightness level.

6. The method of claim 3, wherein said deriving the picture level correction step comprises:
   measuring at least one brightness level of said input video signal;
   selecting for said picture level correction a first RGB correction matrix if said brightness level is within a first range of values; and
   selecting for said picture level correction a second RGB correction matrix if said brightness level is within a second range of values.

7. The method of claim 6, wherein said deriving the picture level correction step further comprises interpolating said picture level from said plurality of RGB correction matrices if said brightness level is within a third range of values.

8. The method of claim 3, further comprising the step of applying horizontal and vertical pixel interpolation on said RGB correction matrices after said selecting the plurality of RGB correction matrices step.

9. The method of claim 1, wherein said applying said dithered non-uniformity color correction to said input video signal step comprises adding said dithered non-uniformity color correction to said input video signal.

10. The method of claim 1, wherein said applying said dithered non-uniformity color correction to said input video signal step comprises multiplying said input video signal by said dithered non-uniformity color correction.

11. The method of claim 1, wherein said step of generating a dithered non-uniformity color correction comprises:
   selecting from a data storage at least one RGB correction matrix;
   applying horizontal and vertical pixel interpolation on said RGB correction matrix to generate a pixel interpolated RGB correction matrix;
   deriving a picture level correction from said pixel interpolated RGB correction matrix; and
   dithering said picture level correction.

12. A method for color correcting video signals in video displays, comprising the steps of:
   receiving at least one input video signal;
   generating a non-uniformity color correction;
   applying said non-uniformity color correction to said input video signal to generate a color corrected video signal; and increasing a frame rate of said color corrected video signal by generating frames of opposite polarities for each color corrected frame of video.

13. A system for color correcting video signals for video displays, comprising:
   a video input for receiving at least one input video signal;
   a color non-uniformity corrector for generating a color corrected video signal; and
      a frame rate increaser for increasing the frame rate of said color corrected video signal by generating frames of opposite polarities for each color corrected frame of video.

14. The system of claim 13, further comprising a gamma corrector for applying gamma correction to said color corrected video signal.

15. The system of claim 13, wherein said color non-uniformity corrector comprises:
   a correction generator for generating a non-uniformity color correction signal;
   a ditherer for dithering said non-uniformity color correction signal; and
   a processor for incorporating said non-uniformity color correction into said at least one input video signal to generate a color corrected video signal.

16. The system of claim 15 wherein said processor is an adder.

17. The system of claim 15 wherein said processor is a multiplier.

18. The system of claim 15 further comprising at least one data storage for storing a plurality of RGB correction matrices.

19. The system of claim 18 wherein said at least one data storage comprises at least one EEPROM.

20. The system of claim 15 further comprising at least one horizontal and vertical interpolator for performing pixel interpolation on said RGB correction matrices.

21. The system of claim 15 wherein said correction generator comprises:
   a brightness detector for detecting the brightness of said input video signal and outputting a brightness level measurement; and
   a soft switch for receiving said brightness level measurement and generating a color correction based on said brightness level measurement.

22. The system of claim 21 further comprising:
   at least one of a data storage and a horizontal and vertical interpolator;
   wherein said soft switch receives at least one RGB correction matrix from at least one of said data storage and said horizontal and vertical interpolator and generates said color correction from said at least one RGB correction matrix.

23. The system of claim 22 wherein:
   said soft switch selects a first RGB correction matrix if said brightness measurement level is within a first range of values:
   said soft switch selects a second RGB correction matrix if said brightness measurement level is within a second range of value; and
   said soft switch interpolates a plurality of RGB correction matrices if said brightness measurement level is within a third range of values.

* * * * *